United States Patent
Smith et al.

(10) Patent No.: US 11,937,316 B2
(45) Date of Patent: Mar. 19, 2024

(54) MULTI-LINK SELECTION BASED ON TRANSMIT POWER CONTROL (TPC)

(71) Applicant: Cisco Technology, Inc., San Jose, CA (US)

(72) Inventors: Malcolm Muir Smith, Richardson, TX (US); Indermeet Singh Gandhi, San Jose, CA (US); Peter Ecclesine, Gilroy, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/306,729

(22) Filed: May 3, 2021

(65) Prior Publication Data

US 2022/0353933 A1    Nov. 3, 2022

(51) Int. Cl.
*H04W 76/15* (2018.01)
*H04W 28/02* (2009.01)
*H04W 76/10* (2018.01)

(52) U.S. Cl.
CPC ............ *H04W 76/15* (2018.02); *H04W 28/02* (2013.01); *H04W 28/0215* (2013.01); *H04W 28/0221* (2013.01); *H04W 76/10* (2018.02)

(58) Field of Classification Search
CPC . H04W 76/15; H04W 76/10; H04W 28/0215; H04W 28/0221; H04W 28/02; H04W 28/0226; H04W 28/0231; H04W 28/0236; H04W 52/38; H04W 52/386; H04W 52/40; H04W 52/50; H04W 72/0473
See application file for complete search history.

(56) References Cited

U.S. PATENT DOCUMENTS

| 10,999,883 B1* | 5/2021 | Marupaduga | H04W 52/223 |
| 2014/0241281 A1* | 8/2014 | Wu | H04W 76/15 |
| | | | 370/329 |
| 2014/0328257 A1* | 11/2014 | Kamlani | H04W 76/10 |
| | | | 370/329 |
| 2016/0165499 A1* | 6/2016 | Xu | H04W 36/0033 |
| | | | 370/331 |

(Continued)

FOREIGN PATENT DOCUMENTS

| EP | 3793312 A2 * | 3/2021 | .......... H04L 5/0055 |
| EP | 3986023 A1 | 4/2022 | |

(Continued)

OTHER PUBLICATIONS

Deng, Cailian et al. "IEEE 802.11BE—Wi-Fi 7: New Challenges and Opportunities" arxiv.org, Aug. 3, 2020 (7 pages).

(Continued)

*Primary Examiner* — Sudesh M Patidar
(74) *Attorney, Agent, or Firm* — Merchant & Gould P.C.

(57) ABSTRACT

Multi-link selection based on Transmit Power Control (TPC) may be provided. A computing device may receive Multi-Link Device (MLD) association information associated with a client device. The MLD association information may describe MLD links the client device may require. A set of MLD links available on a network may be determined based on the MLD association information. The determined set of MLD links may then be sent to the client device.

20 Claims, 3 Drawing Sheets

(56) References Cited

U.S. PATENT DOCUMENTS

| | | | |
|---|---|---|---|
| 2016/0337904 A1* | 11/2016 | Hsu | H04W 28/0289 |
| 2018/0262993 A1 | 9/2018 | Akkarakaran et al. | |
| 2020/0221545 A1 | 7/2020 | Stacey et al. | |
| 2021/0058856 A1* | 2/2021 | Qi | H04W 48/16 |
| 2021/0075567 A1* | 3/2021 | Van Der Velde | H04W 76/15 |
| 2021/0185607 A1* | 6/2021 | Cariou | H04W 52/0216 |
| 2021/0219363 A1* | 7/2021 | Jiang | H04W 24/08 |
| 2022/0225406 A1* | 7/2022 | Kim | H04W 74/0816 |

FOREIGN PATENT DOCUMENTS

| | | | |
|---|---|---|---|
| WO | WO2017020192 | * | 9/2017 |
| WO | 2020091332 A1 | | 5/2020 |
| WO | 2021010606 A1 | | 1/2021 |
| WO | WO2021003700 | * | 1/2021 |

OTHER PUBLICATIONS

Garcia-Rodriguez, Adrian et al. "IEEE 80S.11BE: "Wi-Fi 7 Strikes Back, arxiv.org, Aug. 6, 2020 (7 pages).

International Search Report and Written Opinion issued in International Application No. PCT/US2022/026734, dated Aug. 3, 2022.

* cited by examiner

MULTI-LINK SELECTION BASED ON TRANSMIT POWER CONTROL (TPC)

TECHNICAL FIELD

The present disclosure relates generally to multi-link selection based on transmit power control (TPC).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
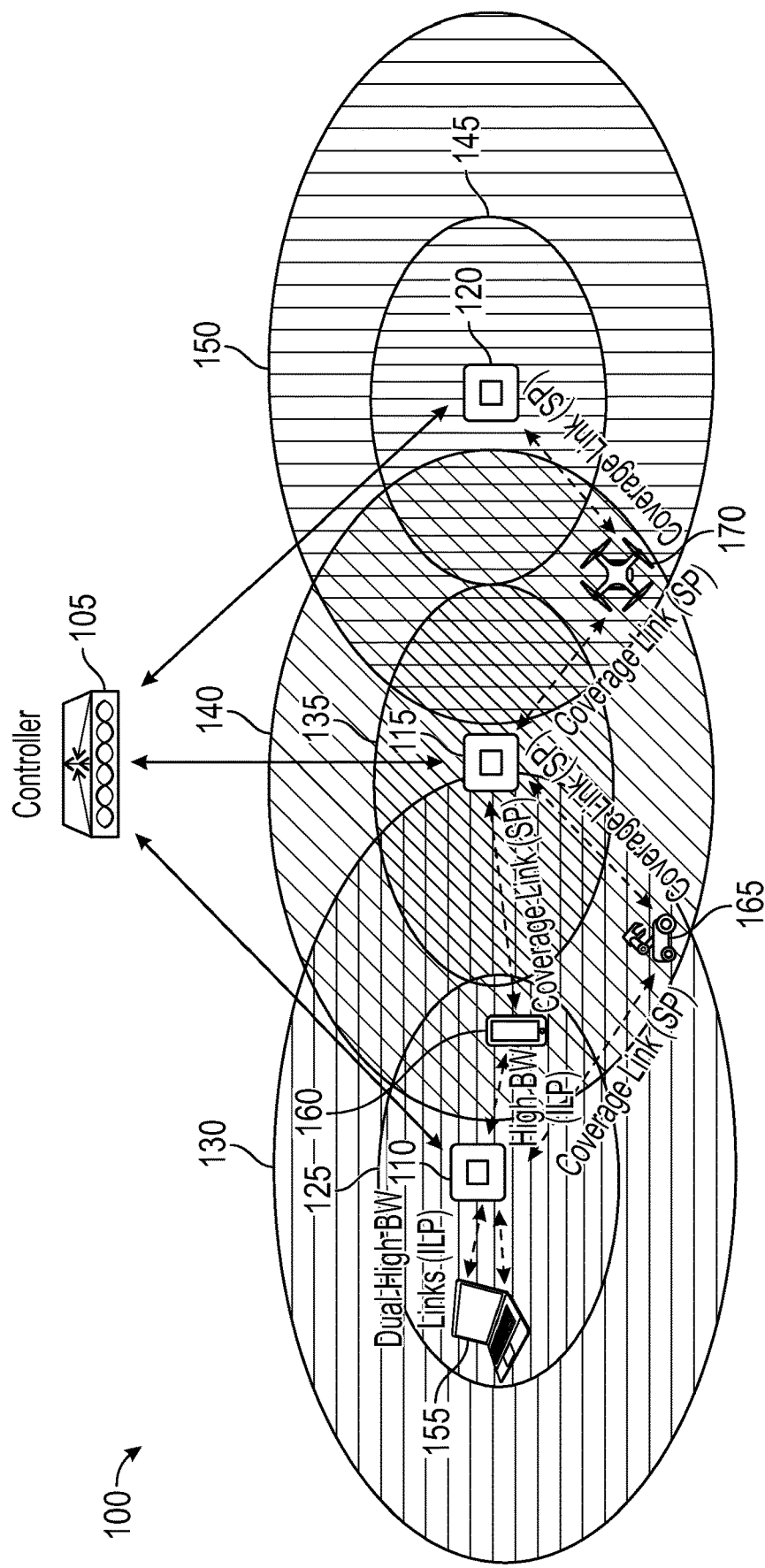
FIG. 1 is a block diagram of an operating environment for providing multi-link selection based on Transmit Power Control (TPC)

Multi-link selection based on Transmit Power Control (TPC) may be provided. A computing device may receive Multi-Link Device (MLD) association information associated with a client device. The MLD association information may describe MLD links the client device may require. A set of MLD links available on a network may be determined based on the MLD association information. The determined set of MLD links may then be sent to the client device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wi-Fi 6 and Wi-Fi 7 in 6 GHz may have various Transmit Power Control (TPC) options. These TPC options may include, but are not limited to, Standard Power (SP), which may be governed by the Automated Frequency Control (AFC) system and Low Power Indoor (LPI), which may be governed by fixed geographic-specific rules. While the Institute of Electrical and Electronics Engineers (IEEE) 802.11be standard may provide Information Elements (IEs) for Access Points (APs) to advertise the TPC regime in effect on each Basic Service Set Identifier (BSSID) and Stations (STAs) (e.g., client devices) to indicate support for these regimes on each radio, there may be no guidance or rules established for a Multi-Link Device (MLD) that may be able to associate with one or both of these types of links. Furthermore, there may be no policy for how the AP should configure each radio link given this flexibility. Embodiments of the disclosure may determine a set of MLD links available on a multi power-class network based on the MLD needs of a client device and provide the client device with these links.

FIG. 1 shows an operating environment 100 for providing multi-link selection based on Transmit Power Control (TPC). As shown in FIG. 1, operating environment 100 may comprise a controller 105 and a plurality of Access Points (APs). The plurality of APs may comprise a first AP 110, a second AP 115, and a third AP 120. Each of the plurality of APs may be compatible with specification standards such as, but not limited to, the IEEE 802.11 specification standard for example.

The plurality of APs may provide a coverage environment (e.g., a multi power-class network). For example, first AP 110 may provide a first AP first coverage environment 125 (e.g., through high bandwidth LPI links) and a first AP second coverage environment 130 (e.g., through SP links (i.e., coverage links)). Similarly, second AP 115 may provide a second AP first coverage environment 135 (e.g., through high bandwidth LPI links) and a second AP second coverage environment 140 (e.g., through SP links (i.e., coverage links)). Likewise, third AP 120 may provide a third AP first coverage environment 145 (e.g., through high bandwidth LPI links) and a third AP second coverage environment 150 (e.g., through SP links (i.e., coverage links)).

Taken together, first AP first coverage environment 125, first AP second coverage environment 130, second AP first coverage environment 135, second AP second coverage environment 140, third AP first coverage environment 145, and third AP second coverage environment 150 may provide a Wireless Local Area Network (WLAN) through the plurality of APs. This WLAN may provide wireless network access (e.g., access to the WLAN) for a plurality of client devices as the plurality of client devices move within operating environment 100 for example. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device. In the example shown in FIG. 1, the plurality of client devices may comprise a first client device 155 (e.g., a laptop computer), a second client device 160 (e.g., a smart phone), a third client device 165 (e.g., an ATV), and a fourth client device 170 (e.g., a drone).

Controller 105 may comprise a Wireless Local Area Network controller (WLC) and may provision and control operating environment 100 (e.g., the WLAN). Controller 105 may allow the plurality of client devices to join operating environment 100. In some embodiments of the disclosure, controller 105 may be implemented by a Digital Network Architecture Center (DNAC) controller (i.e., a Software-Defined Network (SDN) controller) that may configure information for operating environment 100 in order to provide multi-link selection based on TPC.

The elements described above of operating environment 100 (e.g., controller 105, first AP 110, second AP 115, third AP 120, first client device 155, second client device 160, third client device 165, and fourth client device 170) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
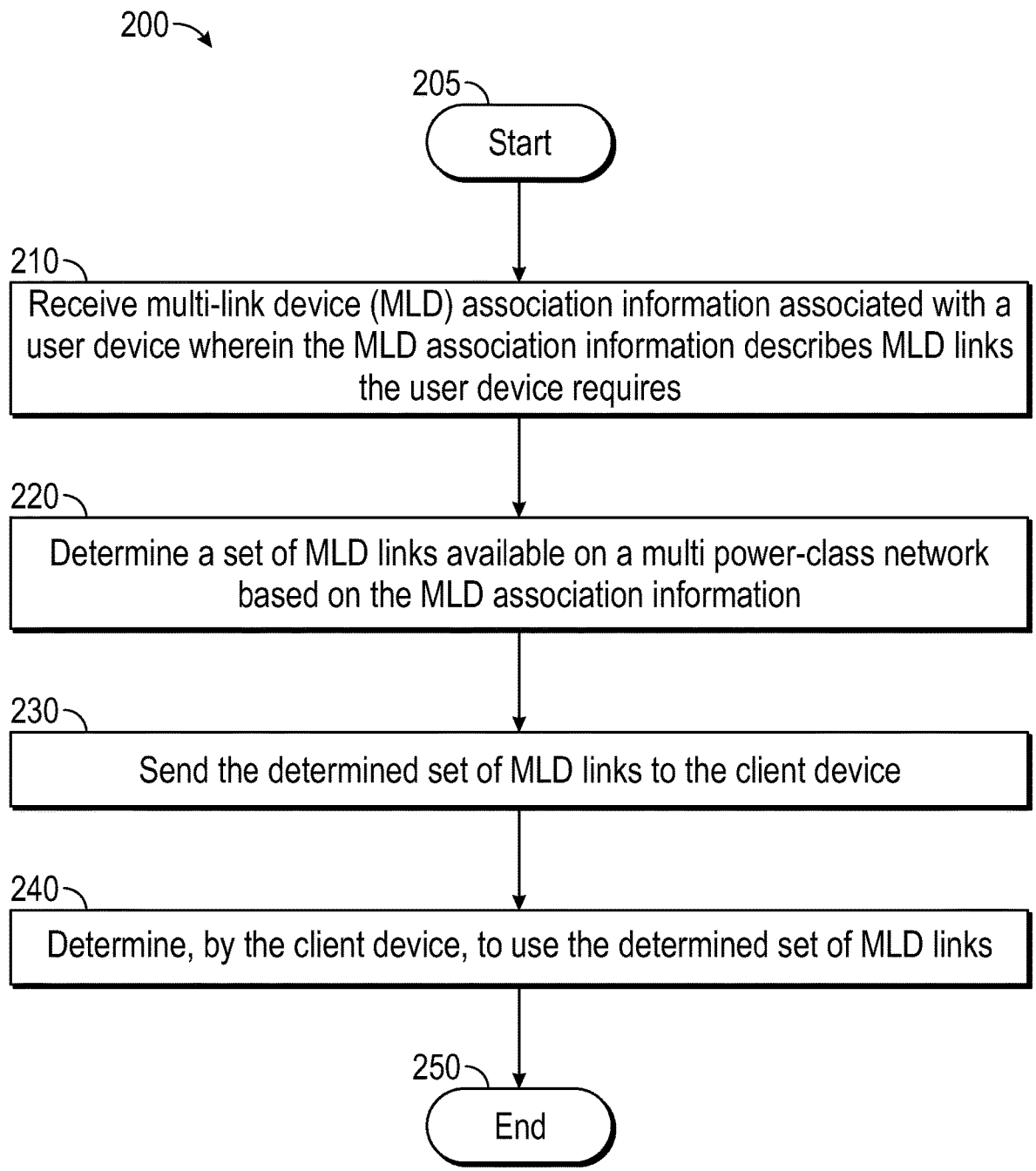
FIG. 2 is a flow chart of a method for providing multi-link selection based on TPC.

FIG. 2 is a flow chart setting forth the general stages involved in a method 200 consistent with embodiments of the disclosure for providing multi-link selection based on Transmit Power Control (TPC). Method 200 may be implemented using controller 105 as described in more detail above with respect to FIG. 1. Ways to implement the stages of method 200 will be described in greater detail below.

Consistent with embodiments of the disclosure, controller 105 may formulate recommended MLD links (e.g., combination of a first link (e.g., 2.4 GHz), a second link (e.g., 5 GHz), and a third link (e.g., 6 GHz)) based, for example, on an AP supporting both LPI and SP, and specific client device capabilities (e.g., supporting SP or just LPI) and characteristics (e.g., client device being mobile or high bandwidth needs).

One objective of this formulation may be for an AP to provide coverage extension with high-power SP in a macro-cell of a dual 6 GHz AP for better handoff and LPI in a micro-cell of the dual-6 GHz AP. Another formulation objective may be to provide SP and LPI in the same omni-cell of the dual 6 GHz AP, but one with low bandwidth (e.g., SP) and one with high bandwidth (e.g., LPI) for capacity. Furthermore, yet another formulation objective for a dual-band 5/6 GHz client device may be seamless handover with maximum capacity in which case the desired client device attachment sequence may be to start with a primary link using the high bandwidth LPI 6 GHz radio with a backup on the 5 GHz radio link and then as it transitions out of the micro-cell, swap to the high-power 6 GHz SP macro-cell as primary for wider coverage and keep the backup 5 GHz radio. An LPI radio may have a higher bias towards larger channel bandwidth (i.e., constant Power Spectral Density (PSD)), which may be suitable for bandwidth hungry client devices, but may result in more roaming events if the client devices are mobile. On the contrary, an AFC enabled SP radio may not care much regarding the channel bandwidth (i.e., no constant PSD) or have limited bandwidth available, and be useful to provide much larger coverage with limited bandwidth (e.g., 20 MHz) suitable for mobile clients. Connecting to the SP radio may mean less roaming events, and thus fewer chances of losing connectivity to the network.

An additional link selection consideration may be to avoid large coverage mismatch (e.g., an AP may use SP, but a client device may only use LPI or the AP uses LPI, but the client device may use SP, both AP and STA under SP or LPI but STA operating 6 dB below AP as per spec). The former may be trivial, because it can be steered to a better BSSID with LPI-only, but the second and third may require excluding advertisement of the 802.11 transmit power envelope (TPE) IE (i.e., LPI-only) to the client device.

Steering the client device towards a desired link set, as described above, may be challenging (the client device may ultimately decide), but when a client device initiates association with an MLD AP for (e.g., default) all radios the AP contains, controller 105 may formulate the desired MLD combination (e.g., based on the above process). In addition, controller 105 may exclude inappropriate BSSIDs and add better BSSIDs into the MLD association response.

Method 200 may begin at starting block 205 and proceed to stage 210 where controller 105 may receive Multi-Link Device (MLD) association information associated with a client device. The MLD association information may describe MLD links the client device requires. For example, a client device may provide the MLD association information to seek the available links to establish MLD association by providing its requirements. Such an exchange from the client devices to controller 105 may be possible during an 802.11 initial association or through Access Network Query Protocol (ANQP).

First client device 155 (e.g., a laptop computer), for example, may be less mobile and may be running a high bandwidth application. In this case, first client device 155 may provide the MLD association information to seek a first high bandwidth link and a second high bandwidth link. Second client device 160 (e.g., a smart phone) may be more mobile than a laptop and may be running a high bandwidth application. In this case, second client device 160 may provide the MLD association information to seek a first high bandwidth link and a first coverage link. Third client device 165 (e.g., an ATV) and fourth client device 170 (e.g., a drone or an UAV) may be more mobile than a laptop or a smart phone and may frequently pass between the coverages of the plurality of APs. In this case, third client device 165 and fourth client device 170 may provide the MLD association information to seek a first coverage link and a second coverage link.

From stage 210, where controller 105 receives the MLD association information associated with the client device, method 200 may advance to stage 220 where controller 105 may determine a set of MLD links available on a multi power-class network (e.g., operating environment 100) based on the MLD association information. For example, in response to receiving the MLD association information, controller 105 may formulate the available links to be provided to the client device.

In the above example where first client device 155 (e.g., a laptop computer) may provide the MLD association information to seek a first high bandwidth link and a second high bandwidth link, the formulated available links may comprise a first high bandwidth LPI link and a second high bandwidth LPI link, both on the same AP or from different APs. In the above example where second client device 160 (e.g., a smart phone) may provide the MLD association information to seek a first high bandwidth link and a first coverage link, the formulated available links may comprise a first high bandwidth LPI link and a first SP link (e.g., high coverage AFC), both on the same AP or from different APs. In the above example where third client device 165 (e.g., an ATV) and fourth client device 170 (e.g., a drone or a UAV) may provide the MLD association information to seek a first coverage link and a second coverage link, the formulated available links may comprise a first SP link (e.g., high coverage AFC) and a second SP link (e.g., high coverage AFC), both on the same AP or from different APs.

Once controller 105 determines the set of MLD links available on the multi power-class network based on the MLD association information in stage 220, method 200 may continue to stage 230 where controller 105 may send the determined set of MLD links to the client device. For example, the formulated links described above for the different example client devices may be sent to the different example client devices. Each of the links exchanged with a client device may include AP radio type information associated with the set of MLD links, for example: i) AFC enable SP with channel bandwidth; ii) LPI radio with channel bandwidth; and iii) regular 2.4/5 GHz link.

After controller 105 sends the determined set of MLD links to the client device in stage 230, method 200 may proceed to stage 240 where the client device may determine to use the determined set of MLD links. For example, the client device may determine the MLD links to choose using the recommendation that was formulated and provided by controller 105 using a mix of LPI and SP powered radios or LPI/SP on both radios depending on its characteristics (e.g., mobile or high bandwidth needs). Once the client device determines to use the determined set of MLD links in stage 240, method 200 may then end at stage 250.

Figure 3:
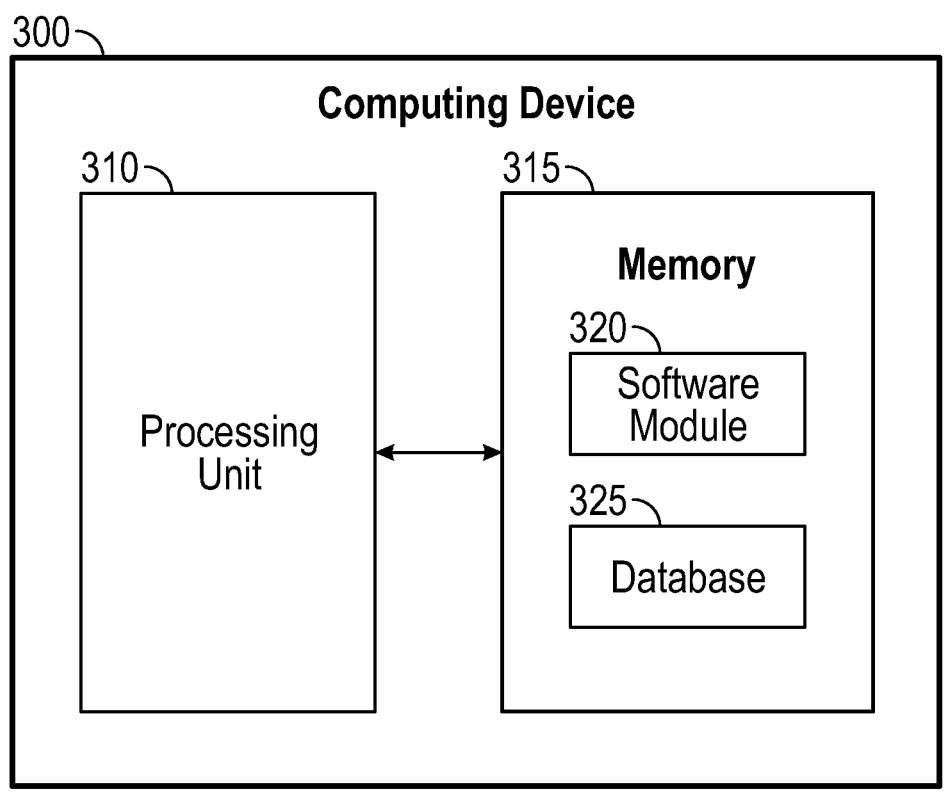
FIG. 3 is a block diagram of a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing multi-link selection based on Transmit Power Control (TPC) as described above with respect to FIG. 2. Computing device 300, for example, may provide an operating environment for controller 105, first AP 110, second AP 115, third AP 120, first client device 155, second client device 160, third client device 165, and fourth client device 170. Controller 105, first AP 110, second AP 115, third AP 120, first client device 155, second client device 160, third client device 165, and fourth client device 170 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
    receiving, by a computing device, Multi-Link Device (MLD) association information associated with a client device, wherein the MLD association information describes MLD links the client device requires;
    determining, by the computing device, a set of MLD links available on a network based on the MLD association information, wherein determining, by the computing device, the set of MLD links available on the network based on the MLD association information comprises determining, by the computing device, at least two MLD links from a plurality of multi-power class links comprising a Standard Power (SP) link and a Low Power Indoor (LPI) link available in the network based on client device capabilities comprising support for the SP link and the LPI link, and wherein the SP link comprises a lower channel bandwidth and a larger coverage than the LPI link; and
    sending, by the computing device, the determined set of MLD links and Access Point (AP) radio type information associated with the set of MLD links to the client device, wherein the client device chooses two or more MLD links from the set of MLD links sent by the computing device based on a link bandwidth the client device requires and client device mobility information.

2. The method of claim 1, wherein the AP radio type information associated with the set of MLD links comprises: Automated Frequency Control (AFC) enabled SP link with a channel bandwidth, the LPI link with a channel bandwidth, and a 2.4/5 GHz link.

3. The method of claim 1, further comprising determining, by the client device, to use the determined set of MLD links.

4. The method of claim 1, wherein the MLD association information indicates that the client device requires a first high bandwidth link and a second high bandwidth link.

5. The method of claim 4, wherein the set of MLD links available comprises a first high bandwidth LPI link and a second high bandwidth LPI link.

6. The method of claim 5, wherein the first high bandwidth LPI link and the second high bandwidth LPI link are from a same AP.

7. The method of claim 1, wherein the MLD association information indicates that the client device requires a first high bandwidth link and a first coverage link.

8. The method of claim 7, wherein the set of MLD links available comprises a first high bandwidth LPI link and a first SP link.

9. The method of claim 8, wherein the first high bandwidth LPI link and the first SP link are from different APs.

10. The method of claim 1, wherein the MLD association information indicates that the client device requires a first coverage link and a second coverage link.

11. The method of claim 10, wherein the set of MLD links available comprises a first SP link and a second SP link.

12. The method of claim 11, wherein the first SP link and the second SP link are from different APs.

13. A system comprising:
    a memory storage; and
    a processing unit, the processing unit coupled to the memory storage, wherein the processing unit is operative to:
        receive Multi-Link Device (MLD) association information associated with a client device, wherein the MLD association information describes MLD links the client device requires;
        determine a set of MLD links available on a network based on the MLD association information, wherein the processing unit being operative to determine the set of MLD links available on the network based on the MLD association information comprises the processing unit being operative to determine at least two MLD links from a plurality of multi-power class links comprising a Standard Power (SP) link and a Low Power Indoor (LPI) link available in the network based on client device capabilities comprising support for the SP link and the LPI link, and wherein the SP link comprises both a lower channel bandwidth and a larger coverage than the LPI link; and
        send the determined set of MLD links and Access Point (AP) radio type information associated with the set of MLD links to the client device, wherein the client device chooses two or more MLD links from the set of MLD links sent by the computing device based on a link bandwidth the client device requires and client device mobility information.

14. The system of claim 13, wherein the MLD association information indicates that the client device requires a first high bandwidth link and a second high bandwidth link.

15. The system of claim 13, wherein the MLD association information indicates that the client device requires a first high bandwidth link and a first coverage link.

16. The system of claim 13, wherein the MLD association information indicates that the client device requires a first coverage link and a second coverage link.

17. A non-transitory computer-readable medium that stores a set of instructions which when executed perform a method executed by the set of instructions comprising:

receiving, by a computing device, Multi-Link Device (MLD) association information associated with a client device, wherein the MLD association information describes MLD links the client device requires;

determining a set of MLD links available on a network based on the MLD association information, wherein determining the set of MLD links available on the network based on the MLD association information comprises determining at least two MLD links from a plurality of multi-power class links comprising a Standard Power (SP) link and a Low Power Indoor (LPI) link available in the network based on client device capabilities comprising support for the SP link and the LPI link, and wherein the SP link comprises a lower channel bandwidth and a larger coverage than the LPI link; and sending the determined set of MLD links and Access Point (AP) radio type information associated with the set of MLD links to the client device, wherein the client device chooses two or more MLD links from the set of MLD links sent by the computing device based on a link bandwidth the client device requires and client device mobility information.

18. The non-transitory computer-readable medium of claim 17, wherein the MLD association information indicates that the client device requires a first high bandwidth link and a second high bandwidth link.

19. The non-transitory computer-readable medium of claim 17, wherein the MLD association information indicates that the client device requires a first high bandwidth link and a first coverage link.

20. The non-transitory computer-readable medium of claim 17, wherein the MLD association information indicates that the client device requires a first coverage link and a second coverage link.

* * * * *